United States Patent [19]

English et al.

[11] Patent Number: 4,862,253
[45] Date of Patent: Aug. 29, 1989

[54] APPARATUS FOR CONVERTING A VIDEO PROCESSOR

[75] Inventors: Stanley R. English, Elbridge; Dominick Danna, Syracuse, both of N.Y.

[73] Assignee: Welch Allyn, Inc., Skaneateles Falls, N.Y.

[21] Appl. No.: 221,776

[22] Filed: Jul. 20, 1988

[51] Int. Cl.$^4$ .............................................. H04N 9/04
[52] U.S. Cl. ........................................ 358/42; 358/75; 358/98
[58] Field of Search ................ 358/75, 42, 41, 209, 358/294, 55, 98

[56] References Cited

U.S. PATENT DOCUMENTS

| 2,524,651 | 10/1950 | Cooley | 358/294 X |
| 3,515,800 | 6/1970 | Ebihara et al. | 358/42 |
| 3,641,256 | 2/1972 | Davis, Jr. | 358/42 |
| 3,934,081 | 1/1976 | Schumacher | 358/75 |
| 4,433,346 | 2/1984 | Stoffel et al. | 358/294 X |
| 4,442,452 | 5/1984 | Kurata et al. | 358/75 |
| 4,546,381 | 10/1985 | Kurata et al. | 358/75 X |
| 4,668,978 | 5/1987 | Gokita | 358/75 |
| 4,695,878 | 9/1987 | Levine et al. | 358/41 X |
| 4,807,026 | 2/1989 | Nishioka et al. | 358/42 X |

FOREIGN PATENT DOCUMENTS 59-215772  6/1984  Japan ..................... 358/55

Primary Examiner—James J. Groody
Assistant Examiner—E. Anne Faris
Attorney, Agent, or Firm—Wall and Roehrig

[57] ABSTRACT

An apparatus for converting an image generation system of a video processor from one form into at least one other form. The image generation system being of the type having a light source emitting a light beam and a rotating light control wheel, such as a color filter wheel, disposed in the path of the light beam. The converting apparatus comprises a mounting member, displaceably connected to a frame to permit reciprocal movement of said mounting member between a plurality of positions; means, coupled to the mounting member, for actuating the mounting member and a wheel assembly, including the control wheel and means for rotating the control wheel. The wheel assembly is rotatably mounted to the mounting member, such that the position of the control wheel, relative to the light source, is determined by the position of the mounting member. Accordingly, when the mounting member is in one position, the rotating control wheel affects the light beam in one way to provide an image generation system of one form, and when the mounting member is in another position, the rotating control wheel affects the light beam in another way to provide an image generation system of another form.

19 Claims, 3 Drawing Sheets

APPARATUS FOR CONVERTING A VIDEO PROCESSOR

BACKGROUND OF THE INVENTION

The present invention pertains to the field of art involving video systems having a light control wheel for generating color or black and white video images, including video-equipped endoscope and borescope systems.

In typical video-equipped endoscope and borescope systems, a light source is required to illuminate a target in the object plane of the viewing optics. Generally, the white light generated from the light source is projected in the form of a beam and is optically coupled to a viewing probe which is configured to transmit the light into the target area. The incident light reflected from the target is received by a viewing head of the probe which causes an image to be focussed upon an imaging device within the probe. The imaging device receives the image and converts it into electrical signals to be processed. A more detailed description of such systems is provided in U.S. Pat. Nos. 4,532,918 to Wheeler and 4,539,586 to Danna et al.

These systems may employ a light control wheel such as a color filter wheel or a shutter or chopper wheel between the light source and the viewing probe. A color filter wheel can be arranged to rotate a series of different colored filters through the beam of white light emitted by the light source to produce incident source light in a sequence of separate colors to be transmitted to the target area. The reflected light from the target is received by the viewing head as color separated images of the target. Accordingly, a field sequential color video signal may be produced.

The color filter wheel is generally configured with color filters spaced apart from each other in a circular pattern. The regions between the filters generally do not permit transmission of light through the wheel. Hence, these regions act as shutters on a camera system, and are usually employed in that manner. That is, during the period of time the light beam is blocked by these regions, the imaging device, having received a color separated image, is read out by conventional video processing circuitry. A more detailed description of such systems is provided in U.S. Pat. Nos. 4,546,379 and 4,523,224.

In a black and white video system, the unfiltered white light from the light source is transmitted to the target area. However, the necessity for a shutter function remains. This function can be achieved by using a shutter or chopper wheel configured like a fan with flat blades spaced equidistant apart. The beam of light passes between the blades to illuminate the target and generate an image of the target. While the beam is blocked by a blade of the wheel, the received image is read from the imaging device.

In many endoscope and borescope applications calling for viewing a target within a range of twelve inches, color video image generation will produce the optimum picture for diagnostic purposes. On the other hand, when the application calls for viewing targets greater than eighteen inches, black and white image generation will produce the optimum picture. In many practical applications of these instruments, the target range can vary from zero to greater than three feet. Therefore, for optimum viewing of video images, both color and black and white systems are required. Conceivably, a color system can be converted into a black and white system by replacing the color filter wheel with a shutter wheel. However, this approach frequently requires the use of special tools and is not practical for non-technical or inexperienced operators of the systems.

Moreover, it may be desirable to utilize the white light source in the video-equipped endoscope or borescope system as an auxiliary light source for another video system or for a direct viewing scope, such as a borescope. However, for conventional video-equipped systems, this is not possible since the light coupled out of the system is either chopped or chopped and colored. Conceivably, in a black and white video system, the rotating shutter wheel could be paused so the beam of light is permitted to pass between adjacent shutter blades. However, this would require the use of additional control circuitry and a breaking or positioning mechanism, which adds to the complexity and cost of the system.

OBJECT AND SUMMARY OF THE INVENTION

It is therefore an object of this invention to provide an apparatus that avoids the problems associated with conventional video-equipped processors having a single image generation system of the prior art.

It is a more particular object of the present invention to provide an apparatus that eliminates the need in many applications for the use of both a color video processor and a black and white video processor.

It is yet another object of the present invention to provide an expedient means for converting a video processor from one image generation mode to at least one other image generation mode without the need for replacing components or employing tools to adjust components of the system.

It is yet another object of the present invention to provide a video-equipped endoscope or borescope system that can be expediently converted from a color video system to a black and white system for optimum viewing performance over a relatively broad range of target distances.

It is yet a further object of the present invention to provide a video-equipped endoscope or borescope system that can be expediently converted from a black and white or color mode to an auxiliary constant white light source for use with other video systems or with viewing probes.

It is yet a further object of the present invention to provide a video-equipped endoscope or borescope system with infra-red filtering when operating in a color mode and a constant light source mode.

These and other objects of the present invention are attained by an apparatus for converting the image generation system of a video processor from one form into at least one other form. The image generation system is of the type having a light source emitting a light beam and a light control wheel, such as a color filter wheel or a shutter wheel, disposed in the path of the light beam. The apparatus of the present invention includes a mounting member displaceably connected to a frame of the video processor to permit reciprocal movement of the mounting member between a plurality of positions. An actuating means is coupled to the mounting member. A wheel assembly including the light control wheel and a means for rotating the control wheel is rotatably mounted to the mounting member. In such an arrangement, the position of the control wheel, relative to the light source, is determined by the position of the mounting member. The light control wheel may be a color filter wheel containing red, blue and green filters and having a plurality of shutter blades projecting therefrom in a radial direction. Accordingly, when the mounting member is in a first position, the color filter wheel filters the light beam with red, blue and green filters to provide a field sequential color video imaging system. When the mounting member is in a second position, the color filter wheel blocks the light beam with its plurality of shutter blades to provide a black and white video imaging system. When the mounting member is in a third position, the color filter wheel is substantially removed from the path of the light beam to provide a constant light source system.

The apparatus may further comprise an infra-red filtering means contained in a support member. The support member is displaceably connected to the frame of the video processor to permit reciprocal movement of the support member between a filter position (where the infra-red filter means is in the path of the light beam) and an out position (where the infra-red filtering means is substantially removed from the path of the light beam). A linkage means, coupled to the mounting member and to the support member translates unidirectional movement of the mounting member into reciprocal movement of the support member. Accordingly, when the mounting member is in the first position, the infra-red filter means is in the filter position. When the mounting member is in the second position, the infra-red filter means is in the out position. When the mounting member is in the third position, the infra red-filter means is back in the filter position.

BRIEF DESCRIPTION OF THE DRAWINGS

One way of carrying out the invention is described in detail below with reference to drawings which illustrate one specific embodiment, in which.

DETAILED DESCRIPTION OF THE PREFERRED EMBODIMENT

Figure 1:
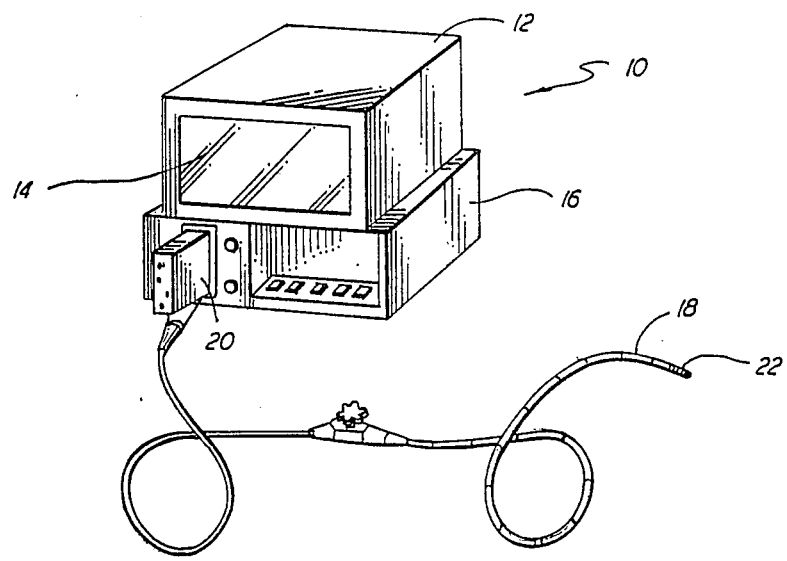
FIG. 1 is a front perspective view of a video endoscopic system embodying the teachings of the present invention.

Referring now to FIG. 1 of the drawings, there is shown a video endoscopic system 10 that is essentially comprised of a video monitor 12, having the usual screen 14, a video processor 16, a viewing probe 18, an interface module 20 that releasably connects the viewing probe to the processor. The viewing probe in an endoscopic system is the portion of the apparatus that enters the body cavity of the patient. At its distal end 22, viewing probe 18 contains a known type of solid state imaging device such as a virtual phase charge coupled imaging device (not shown). A detailed description of video endoscopic system 10 is described in U.S. Pat. Nos. 4,532,918 to Wheeler and 4,539,586 to Danna et al., the contents of which are incorporated herein by reference.

Video equipped endoscope and borescope systems contain an image generation sub-system. In the preferred embodiment, the image generation system comprises a light source 28, emitting a light beam that is deflected approximately 90 degrees by a mirror 30. Mirror 30 directs the light beam through an aperture wheel 32, an infra-red filter 34, a lens 36, a light control wheel 38, and a clear aperture 40, as shown in the top plan view of FIG. 3. The light beam is optically coupled, through interface module 20, to viewing probe 18. Reflected light from the target is received by viewing probe 18, which causes an image to be focussed upon the solid state imaging device located therein. The imaging device receives the image and converts it into electrical signals to be processed. Aperture wheel 32 is generally a solid disk containing a plurality of apertures therethrough. It is mounted on a motor shaft allowing it to be rotated to a plurality of positions. Aperture wheel 32 traverses the optical path 29 of the light beam, and is employed to regulate the intensity of the light beam.

Figure 2:
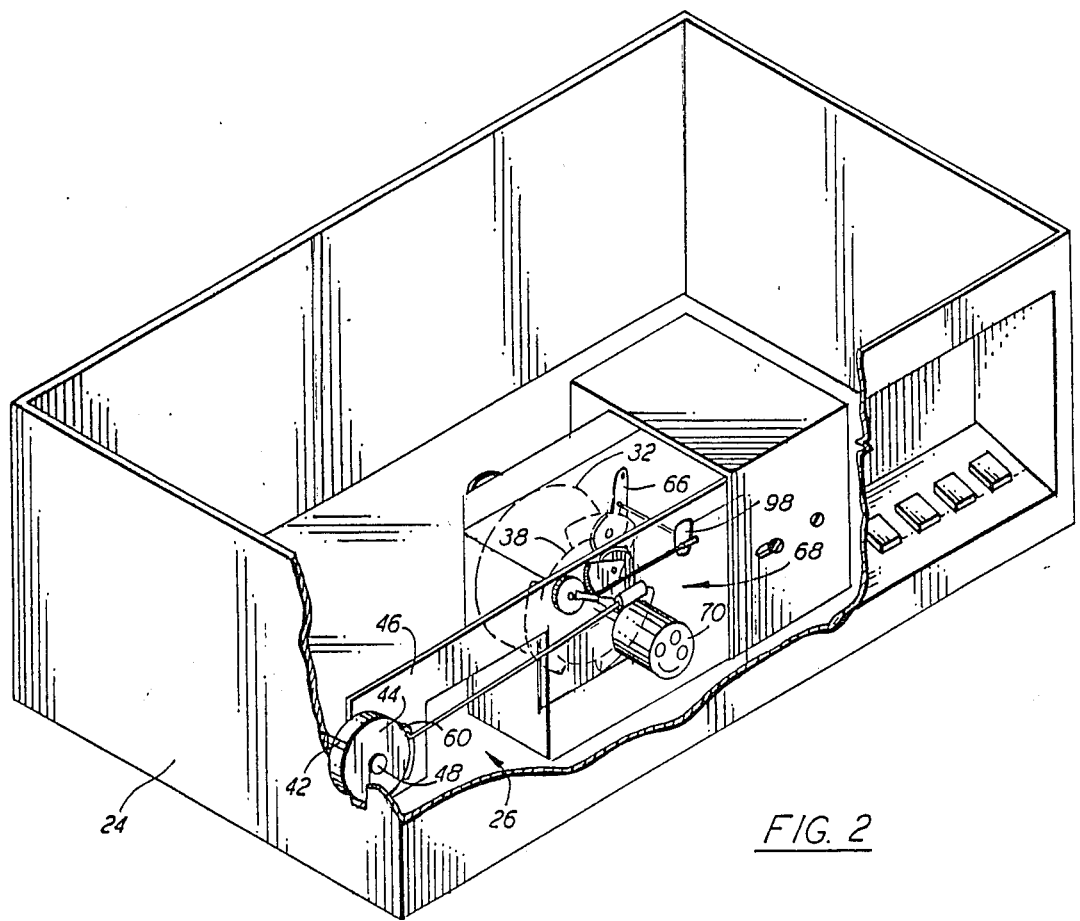
FIG. 2 is an enlarged top perspective view of the processor cabinet to the endoscopic system shown in FIG. 1, with the top cover of the processor cabinet being removed and the front and one side wall being cut away to better illustrate certain details of the apparatus of the present invention.

An enlarged top perspective view of a processor cabinet 24 of video processor 16 is shown in FIG. 2. In FIG. 2, the top cover (not shown) of processor cabinet 24 has been removed and the front wall and part of a side wall of cabinet 24 has been cut away to illustrate a perspective view of the preferred embodiment as it is situated in processor cabinet 24. It is to be understood that the installation of converter apparatus 26 is not restricted to processor cabinet 24. In some processor embodiments, the image generation system is situated in a separate housing, remote from the primary processor components. In such cases, converter apparatus 26 can be employed in the remote housing.

Converting apparatus 26 comprises a lever 42 attached to a rotary cam 44. Rotary cam 44 is in turn attached to a support frame 46 by a shaft 48, as shown in FIGS. 2 and 4.

Figure 5:
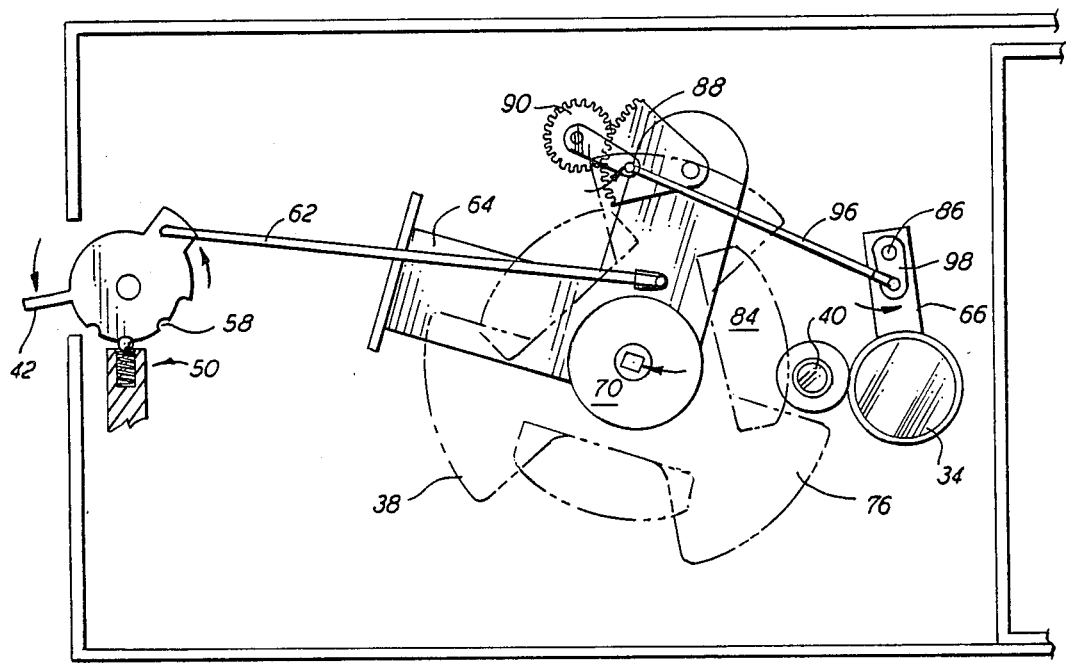
FIG. 5 is an enlarged side elevation view of the present invention showing the converting apparatus set in the black and white image generation position.
Figure 6:
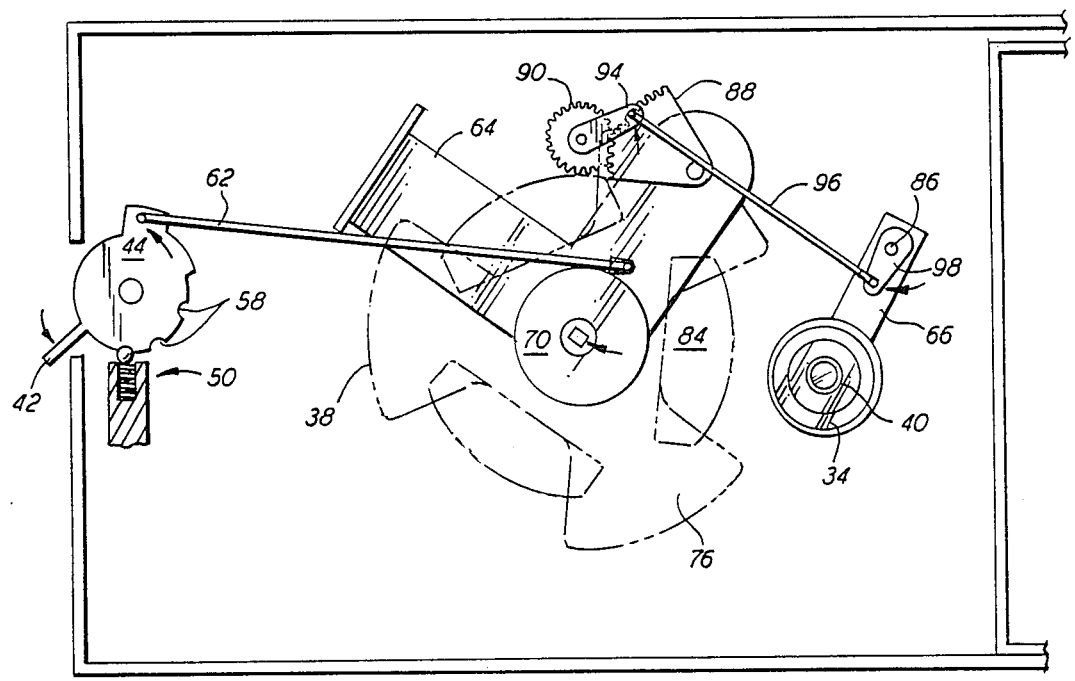
FIG. 6 is an enlarged side elevation view of the present invention showing the converting apparatus set in the constant light source position.

The position of rotary cam 44 is controlled by a ball detent mechanism 50. Ball detent mechanism 50 comprises a housing 52, a compression spring 54, situated in housing 52, and a detent ball 56. Cut from rotary cam 44 are detent notches 58. As detent ball 56 engages one of detent notches 58, rotary cam 44 is secured in position. Upon engagement of detent ball 56 with detent notch 58, compression spring 54 expands to urge detent ball 56 into detent notch 58 for secure engagement with rotary cam 44. As shown in FIGS. 4-6, ball detent mechanism 50 operates to secure rotary cam 44 in three separate positions. Rotary cam 44 further comprises a mounting tab 60, as shown in FIGS. 2, 4-6.

In the preferred embodiment, converting apparatus 26 includes a connecting rod or arm 62 which is pivotally connected to mounting tab 60 at one end and pivotally connected to a mounting plate or member 64 at the other end. Mounting plate 64 is pivotally mounted to supporting frame 46. Therefore, as a result of the above described linkage from rotary cam 44, connecting arm 62, to mounting plate 64, the position of rotary cam 44 determines the position of mounting plate 64, as illustrated by the sequence of FIGS. 4-6.

Figure 4:
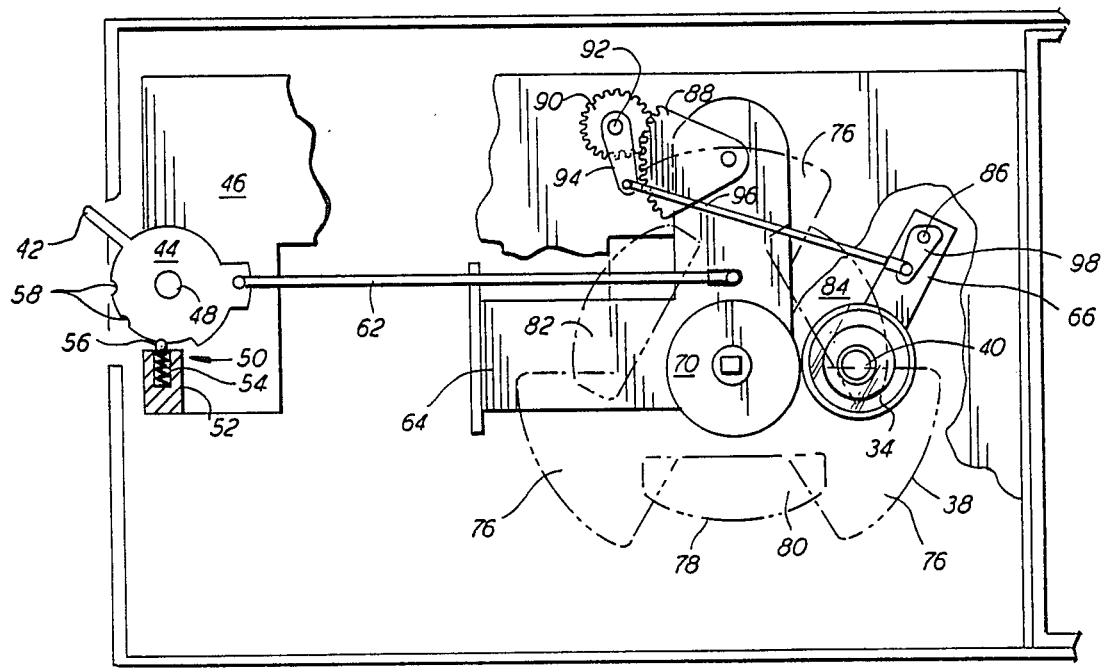
FIG. 4 is an enlarged side elevation view of the present invention, with portions cut away to show detail of the converting apparatus set in the color image generation position.

As shown in FIG. 4, mounting plate 64 is L-shaped. As will be described hereinbelow, mounting plate 64 acts as a lever arm to actuate a linkage between mounting plate 64 and an infra-red filter support member 66, as shown in FIG. 4.

Figure 3:
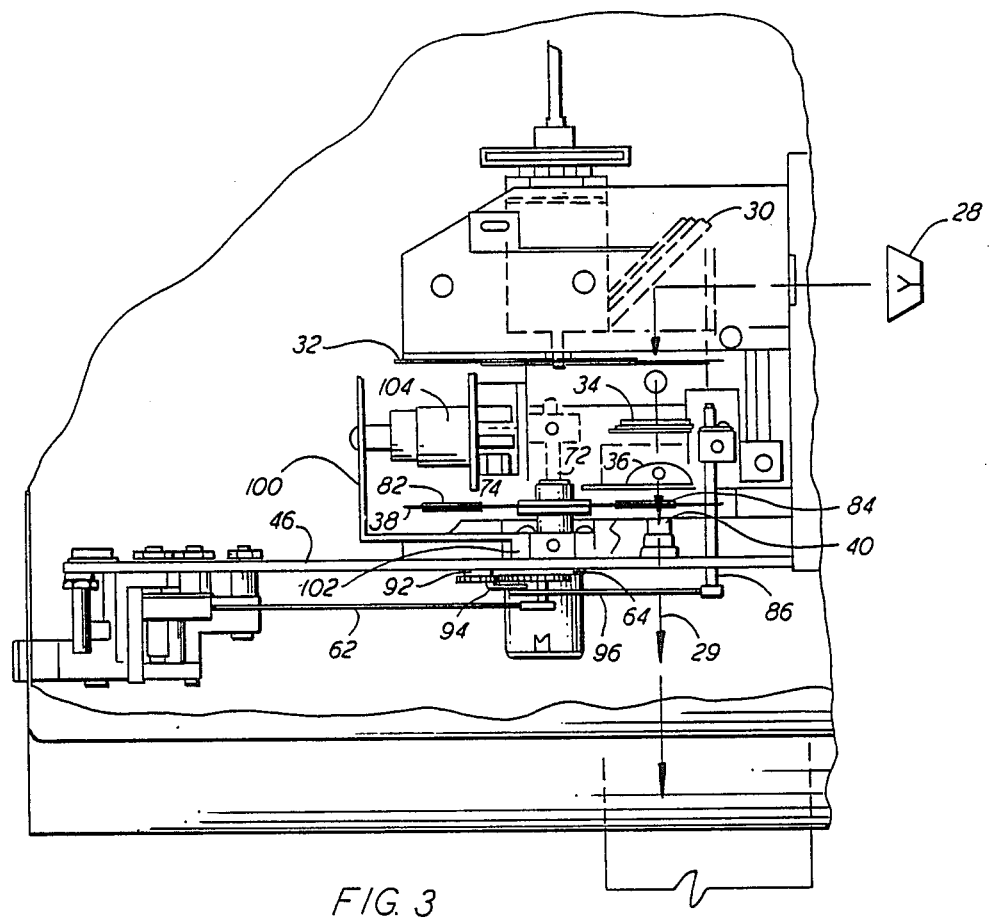
FIG. 3 is an enlarged top plan view of the converting apparatus of the present invention.

The preferred embodiment of converting apparatus 26, further comprises a wheel assembly 68, including a drive motor 70 and light control wheel 38. Drive motor 70 provides the means for rotating light control wheel 38. Motor 70 is fixedly mounted to mounting plate 64. Mounting plate 64 contains an opening to permit a motor shaft 72 of drive motor 70 to pass therethrough. As shown in FIG. 3, light control wheel 38 includes a mounting hub 74, to securely mount control wheel 38 to motor shaft 72.

Control wheel 38 is configured as a combined color filter wheel and shutter wheel in the preferred embodiment. Control wheel 38 includes three flat shutter blades 76, projecting radially from its center. In addition, control wheel 38 contains three aperture regions 78, spaced equidistant apart. Mounted within aperture regions 78 are color filters. A blue filter 80, a green filter 82 and a red filter 84 are contained in aperture regions 78, as indicated in FIG. 4.

Infra-red filter 34 is employed in the preferred embodiment of the present invention to substantially eliminate the infra-red spectral components in the light beam emitted from light source 28. Infra-red filtering is desirable in two of the three operating modes described herein. Infra-red filtering is desired for color video operation, since the solid state imaging device can be overpowered by the red and infra-red spectrum. This effect tends to diminish the green and blue images and destroys the composite color image. In addition, infra-red filtering is desirable when the processor is used as an auxiliary constant light source for fiber optic viewing scopes, where direct viewing with the human eye is anticipated. The infra-red components in the light beam generate heat energy that could injure the human eye without such filtering, when used with fiber optic scope.

Filtering is undesirable for black and white video operation because infra-red spectral components provide additional illumination required for optimum black and white image generation.

Referring now to FIG. 4, infra-red filter 34 is shown contained in support member 66. Support member 66 is pivotally mounted to a connecting shaft 86, such that infra-red filter 34 can be aligned with the light beam in one application and removed from the light beam in another.

Movement of infra-red filter 34 is accomplished by a linkage between mounting plate 64 and support member 66. Mounting plate 64 acts as a lever arm for actuating the linkage between plate 64 and support member 66. A rocker gear 88 is fixedly mounted to mounting plate 64, and has gear teeth meshedly engaging the teeth of a circular gear 90. Circular gear 90 rotatably engages supporting frame 46 through a shaft 92. A first linkage arm 94 is fixedly mounted to circular gear 90 at one end and pivotally connected to a second linkage arm 96 at the other end, as shown in FIG. 4. Second linkage arm 96 is pivotally coupled to a crank 98, shown in FIG. 4. Crank 98 is fixedly connected to connecting shaft 86. Connecting shaft 86 rotatably engages supporting frame 46 at one end and is fixedly mounted to supporting member 66 at the other end, as shown in FIG. 4.

Referring to FIG. 3, an L-shaped bracket 100 is fixedly mounted to an assembly hub 102. Assembly hub 102 is in turn fixedly mounted to the interior surface of supporting frame 46. Assembly hub 102 includes an opening to allow motor shaft 72 to slidably pass therethrough. The purpose of L-shaped bracket 100 is to support a photo optic switch 104. Photo optic switch 104 operates in cooperation with a timing pin, fixedly mounted to motor shaft 72, to detect a complete revolution of control wheel 38. Such an arrangement is well-known to one of ordinary skill in the art.

The operation of the inventive converting apparatus can be described by reference to FIGS. 4-6, showing a sequence of three operating positions of the preferred embodiment. In FIG. 4, rotary cam 44 is secured in a first position by ball detent mechanism 50. From the above description of the preferred embodiment, it follows that movement of rotary cam 44 will actuate movement of mounting plate 64 as a result of connecting arm 62. In this first position, control wheel 38 is disposed such that color filters 80, 82 and 84 are substantially aligned with optical path 29 of the light beam, as control wheel 38 is rotated by drive motor 70. For instance, in FIG. 4, filter 84 is shown aligned with optical path 29 and clear aperture 40. The position of mounting plate 64 determines the position of infra-red filter 34 through the linkage defined by rocker gear 88, circular gear 90, first linkage arm 94, second linkage arm 96, crank 98, and connecting shaft 86. Hence, mounting plate 64 acts as a lever arm and performs an actuating function for said linkage. As illustrated in FIG. 4, infra-red filter 34 is aligned with optical path 29 of the light beam. Accordingly, when rotary cam 44 is in the first position, an image generation system producing color separated images is provided. In addition, the infra-red spectral component of the light beam is filtered out.

Referring now to FIG. 5, rotary cam 44 is now secured in a second position by ball detent mechanism 50. Lever 42, rotary cam 44, and connecting arm 62 perform an actuating function for mounting plate 64, and accordingly for control wheel 38. In this second position, wheel assembly 68 has been pivoted slightly to the left, as shown in FIG. 5. Hence, light control wheel 38 is displaced such that color filters, 80,82 and 84 are no longer aligned with the light beam, as control wheel 38 is rotated by drive motor 70. However, the light beam is chopped by shutter blades 76. For each revolution of light control wheel 38, the light beam is allowed to pass unobstructed over three intervals dictated by the spacing between shutter blades 76.

As shown in FIG. 5 mounting plate 64 has caused rocker gear 88 to move in a clockwise direction, and thus has caused circular gear 90 to move in a counter-clockwise direction carrying with it first linkage arm 94. As first linkage arm 94 moves from the position shown in FIG. 4 to the position shown in FIG. 5, it causes second linkage arm to travel approximately 2/10 of an inch to the right. Displacement of second linkage arm 96, in turn, causes support member 66 to pivot in a counter-clockwise direction, displacing infra-red filter 34 out of alignment with the optical path of the light beam. Accordingly, when rotary cam 44 is in the second position, the image generation system of the video processor is configured to provide chopped white light for generation of a black and white video signal. Moreover, infra-red filter 34 is not in line with optical path 29, and the chopped white light maintains its infra-red spectral component.

Now referring to FIG. 6, rotary cam 44 is secured in a third position by ball detent mechanism 50. Going from the second position to the third position, rotary cam 44 moves in a counter-clockwise direction, pulling connecting rod 62 generally to the left, as shown in FIG. 6. Movement of connecting rod 62 causes mounting plate 64 to pivot in a clockwise direction thus, carrying with it wheel assembly 68. Wheel assembly 68 is displaced far enough so that shutter blades 76 of control wheel 38 no longer traverse optical path 29 during rotation. Hence, a constant, unchopped, light source is provided.

As rotary cam 44 goes from the second position to the third position, mounting plate 64 actuates the linkage coupled to infra-red filter 34, causing infra-red filter 34 to pivot back in line with optical path 29 of the light beam. As shown by FIG. 6, mounting plate 64 carries with it rocker gear 88 in a clockwise direction, causing circular gear 90 to move in a counter-clockwise direction. Circular gear 90 carries with it first linkage arm 94, which causes second linkage arm 96 to pull infra-red filter 34, and cause it to pivot in a clockwise direction. Accordingly, the infra-red spectral components are filtered out of the constant light source.

As an alternative to lever 42, rotary cam 44 may be actuated by a motor or solenoid. In addition, rotary cam 44 may be replaced with a reciprocating slide mechanism.

While the invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for converting an image generation system of a video processor from one form into at least one other form, the image generation system being of the type having a light source emitting a light beam and a rotating light control wheel disposed in the path of the light beam, comprising
    a mounting member, having first and second ends, displaceably connected to a frame at its first end to permit reciprocal movement of said mounting member between a plurality of positions,
    means, coupled to said mounting member, for actuating said mounting member, and
    a wheel assembly, including the control wheel and means for rotating the control wheel, rotatably mounted to the second end of said mounting member, such that the position of the control wheel relative to the light source is determined by the position of said mounting member,
    such that when said mounting member is in one position, the rotating control wheel affects the light beam in one way to provide an image generation system of one form, and when said mounting member is in another position, the rotating control wheel affects the light beam in another way to provide an image generation system of another form.

2. Apparatus as recited in claim 1, wherein the control wheel is a color filter wheel containing red, blue, and green filters and having a plurality of blades projecting therefrom in a radial direction, such that when said mounting member is in a first position, the color filter wheel filters the light beam with the red, blue and green filters to provide a field sequential color video imaging system, when said mounting member is in a second position, the color filter wheel blocks the light beam with the plurality of blades to provide a black and white video imaging system, and when said mounting member is in a third position, said color filter wheel is substantially removed from the path of the light beam to provide a constant light source system.

3. An apparatus as recited in claim 1, wherein said control wheel is a shutter wheel containing a plurality of blades projecting therefrom in a radial direction, such that when said mounting member is in a first position, the shutter wheel blocks the light beam with the plurality of blades to provide a black and white video imaging system, and when said mounting member is in a second position, said control wheel is substantially removed from the path of the light beam to provide a constant light source system.

4. An apparatus as recited in claim 1, wherein the control wheel is a color filter wheel containing red, blue and green filters, such that when said mounting member is in a first position, the color filter wheel filters the light beam with the red, blue and green filters to provide a field sequential color video imaging system, when said mounting member is in a second position, the color filter wheel is substantially removed from the path of the light beam to provide a constant light source system.

5. An apparatus as recited in claim 1, further comprising
    means, contained in a support member, for filtering infra-red light, said support member being displaceably connected to the frame to permit reciprocal movement of said support member between a filter position where said infra-red filter means is disposed substantially within the path of the light beam and an out position where said infra-red filter means is substantially removed from the path of the light beam,
    linkage means, coupled to said mounting member and coupled to said support member, for translating movement of said mounting member into reciprocal movement of said support member,
    such that when said mounting member is in one position, said infra-red filter means is in the filter position, and when said mounting member is in another position, said infra-red filter means is in the out position.

6. Apparatus as recited in claim 2, further comprising
    means, contained in a support member, for filtering infra-red light, said support member being displaceably connected to the frame to permit reciprocal movement of said support member between a filter position where said infra-red filter means is disposed substantially within the path of the light beam and an out position where said infra-red filter means is substantially removed from the path of the light beam, linkage means, coupled to said mounting member and coupled to said support member, for translating movement of said mounting member into reciprocal movement of said support member, such that when said mounting member is in the first position, said infra-red filter means is in the filter position, when said mounting member is in the second position, said infra-red filter means is in the out position, and when said mounting member is in the third position, said infra-red filter means is back in the filter position.

7. An apparatus as cited in claim 3, further comprising means, contained in a support member, for filtering infra-red light, said support member being displaceably connected to the frame to permit reciprocal movement of said support member between a filter position where said infra-red filter means is disposed substantially within the path of the light beam and an out position where said infra-red filter means is substantially removed from the path of the light beam, linkage means, coupled to said mounting member and coupled to said support member, for translating movement of said mounting member into reciprocal movement of said support member, such that, when said mounting member is in the first position said infra-red filter means is in the out position, and when said mounting member is in the second position said infra-red filter means is in the filter position.

8. An apparatus as recited in claim 4, further comprising means, contained in a support member, for filtering infra-red light, said support member being displaceably connected to the frame to permit reciprocal movement of said support member between a filter position where said infra-red filter means is disposed substantially within the path of the light beam and an out position where said infra-red filter means is substantially removed from the path of the light beam, linkage means, coupled to said mounting member and coupled to said support member, for translating movement of said mounting member into reciprocal movement of said support member, such that when said mounting member is in the first position said infra-red filter means is in the filter position, and when said mounting member is in the second position, said infra-red filter is in the out position.

9. An apparatus as recited in claim 1, wherein said actuating means comprises a cam wheel rotatably mounted to the frame, a lever, connected to said cam wheel for rotating said cam wheel from one position to at least one other position, and a connecting arm having one end mounted to said cam wheel and the other end mounted to said mounting member, such that the position of said mounting member is determined by the position of said cam wheel.

10. An apparatus as recited in claim 2, wherein said actuating means comprises a cam wheel rotatably mounted to the frame, a lever, connected to said cam wheel for rotating said cam wheel from one position to at least one other position, and a connecting arm having one end mounted to said cam wheel and the other end mounted to said mounting member, such that the position of said mounting member is determined by the position of said cam wheel.

11. An apparatus as recited in claim 3, wherein said actuating means comprises a cam wheel rotatably mounted to the frame, a lever, connected to said cam wheel for rotating said cam wheel from one position to at least one other position, and a connecting arm having one end mounted to said cam wheel and the other end mounted to said mounting member, such that the position of said mounting member is determined by the position of said cam wheel.

12. An apparatus as recited in claim 4, wherein said actuating means comprises a cam wheel rotatably mounted to the frame, a lever, connected to said cam wheel for rotating said cam wheel from one position to at least one other position, and a connecting arm having one end mounted to said cam wheel and the other end mounted to said mounting member, such that the position of said mounting member is determined by the position of said cam wheel.

13. An apparatus as recited in claim 6, wherein said actuating means comprises a cam wheel rotatably mounted to the frame, a lever, connected to said cam wheel for rotating said cam wheel from one position to at least one other position, and a connecting arm having one end mounted to said cam wheel and the other end mounted to said mounting member, such that the position of said mounting member is determined by the position of said cam wheel.

14. An apparatus as recited in claim 7, wherein said actuating means comprises a cam wheel rotatably mounted to the frame, a lever, connected to said cam wheel for rotating said cam wheel from one position to at least one other position, and a connecting arm having one end mounted to said cam wheel and the other end mounted to said mounting member, such that the position of said mounting member is determined by the position of said cam wheel.

15. An apparatus as recited in claim 8, wherein said actuating means comprises a cam wheel rotatably mounted to the frame, a lever, connected to said cam wheel for rotating said cam wheel from one position to at least one other position, and a connecting arm having one end mounted to said cam wheel and the other end mounted to said mounting member, such that the position of said mounting member is determined by the position of said cam wheel.

16. An apparatus as recited in claim 5, wherein said linkage means further comprises a first gear fixedly mounted to said mounting member;

a second gear pivotally coupled to the frame and meshedly engaging said first gear;

a first linkage arm, having first and second ends, said first linkage arm being fixedly mounted to said second gear at its first end;

a second linkage arm, having first and second ends, said second linkage arm being pivotally mounted to the second end of said first linkage arm at its first end;

a crank arm, having first and second ends, said crank arm being pivotally mounted to the second end of said second linkage arm at its first end, and a connecting shaft, rotatably engaging the frame, said connecting shaft being fixedly mounted to the second end of said crank arm at one end and fixedly mounted to said support member at the other end.

17. An apparatus as recited in claim 13, wherein said linkage means further comprises a first gear fixedly mounted to said mounting member;

a second gear pivotally coupled to the frame and meshedly engaging said first gear;

a first linkage arm, having first and second ends, said first linkage arm being fixedly mounted to said second gear at its first end;

a second linkage arm, having first and second ends, said second linkage arm being pivotally mounted to the second end of said first linkage arm at its first end;

a crank arm, having first and second ends, said crank arm being pivotally mounted to the second end of said second linkage arm at its first end, and a connecting shaft, rotatably engaging the frame, said connecting shaft being fixedly mounted to the second end of said crank arm at one end and fixedly mounted to said support member at the other end.

18. An apparatus as recited in claim 14, wherein said linkage means further comprises a first gear fixedly mounted to said mounting member;

a second gear pivotally coupled to the frame and meshedly engaging said first gear;

a first linkage arm, having first and second ends, said first linkage arm being fixedly mounted to said second gear at its first end;

a second linkage arm, having first and second ends, said second linkage arm being pivotally mounted to the second end of said first linkage arm at its first end;

a crank arm, having first and second ends, said crank arm being pivotally mounted to the second end of said second linkage arm at its first end, and a connecting shaft, rotatably engaging the frame, said connecting shaft being fixedly mounted to the second end of said crank arm at one end and fixedly mounted to said support member at the other end.

19. An apparatus as recited in claim 15, wherein said linkage means further comprises a first gear fixedly mounted to said mounting member;

a second gear pivotally coupled to the frame and meshedly engaging said first gear;

a first linkage arm, having first and second ends, said first linkage arm being fixedly mounted to said second gear at its first end;

a second linkage arm, having first and second ends, said second linkage arm being pivotally mounted to the second end of said first linkage arm at its first end;

a crank arm, having first and second ends, said crank arm being pivotally mounted to the second end of said second linkage arm at its first end, and a connecting shaft, rotatably engaging the frame, said connecting shaft being fixedly mounted to the second end of said crank arm at one end and fixedly mounted to said support member at the other end.

* * * * *